(12) United States Patent
Binnendijk et al.

(10) Patent No.: US 9,177,730 B2
(45) Date of Patent: Nov. 3, 2015

(54) TERMINAL FOR AN ELECTRICAL SWITCHGEAR

(75) Inventors: Marten Binnendijk, Hengelo (NL); Arend Lammers, Hengelo (NL)

(73) Assignee: EATON INDUSTRIES (NETHERLANDS) B.V., Hengelo (NL)

( * ) Notice: Subject to any disclaimer, the term of this patent is extended or adjusted under 35 U.S.C. 154(b) by 255 days.

(21) Appl. No.: 13/582,152

(22) PCT Filed: Mar. 1, 2011

(86) PCT No.: PCT/EP2011/000992
§ 371 (c)(1),
(2), (4) Date: Nov. 9, 2012

(87) PCT Pub. No.: WO2011/107254
PCT Pub. Date: Sep. 9, 2011

(65) Prior Publication Data
US 2013/0056341 A1 Mar. 7, 2013

(30) Foreign Application Priority Data

| Mar. 1, 2010 | (EP) | 10002053 |
|---|---|---|
| Mar. 1, 2010 | (EP) | 10002054 |
| Mar. 1, 2010 | (EP) | 10002055 |

(51) Int. Cl.
| *H01H 9/00* | (2006.01) |
| *H02B 11/00* | (2006.01) |
| *H01H 1/40* | (2006.01) |
| *H02B 11/04* | (2006.01) |
| *H02B 11/28* | (2006.01) |
| *H01H 1/36* | (2006.01) |
| *H01H 33/662* | (2006.01) |

(52) U.S. Cl.
CPC .................. *H01H 1/40* (2013.01); *H02B 11/04* (2013.01); *H02B 11/28* (2013.01); *H01H 1/365* (2013.01); *H01H 33/662* (2013.01)

(58) Field of Classification Search
CPC ....... H01H 1/40; H01H 1/365; H01H 33/662; H02B 11/04; H02B 11/28
USPC ........... 200/50.21, 284, 547, 549, 550, 50.27, 200/16 E, 50.22–50.26; 218/7, 147, 218/152–154, 119, 120, 155
See application file for complete search history.

(56) References Cited

U.S. PATENT DOCUMENTS 3,899,722 A    8/1975   Cadez et al.
5,434,369 A *  7/1995   Tempco et al. ............. 200/50.26
(Continued)

FOREIGN PATENT DOCUMENTS

DE        4445172  A1    6/1996

OTHER PUBLICATIONS

European Patent Office, International Search Report in International Patent Application No. PCT/EP2011/000992 (Jun. 21, 2011).

*Primary Examiner* — Renee Luebke
*Assistant Examiner* — Lheiren Mae A Caroc
(74) *Attorney, Agent, or Firm* — Leydig, Voit & Mayer, Ltd.

(57) ABSTRACT

A terminal is provided for an electrical switchgear. The terminal includes: a housing arrangement including an electrically insulating material and having an inner surface defining a cavity; and a first terminal electrical contact contained in the housing arrangement for making an electrical connection with an electrical component insertable into the cavity. The first terminal electrical contact is located in a first recess formed in the inner surface, the first terminal electrical contact being flush with the inner surface.

15 Claims, 8 Drawing Sheets

(56) References Cited

U.S. PATENT DOCUMENTS 8,248,760 B2 * 8/2012 Abrahamsen et al. ........ 361/611
8,525,053 B2 * 9/2013 Abrahamsen et al. ..... 200/50.21
2013/0048478 A1 * 2/2013 Lammers et al. .......... 200/50.27

* cited by examiner

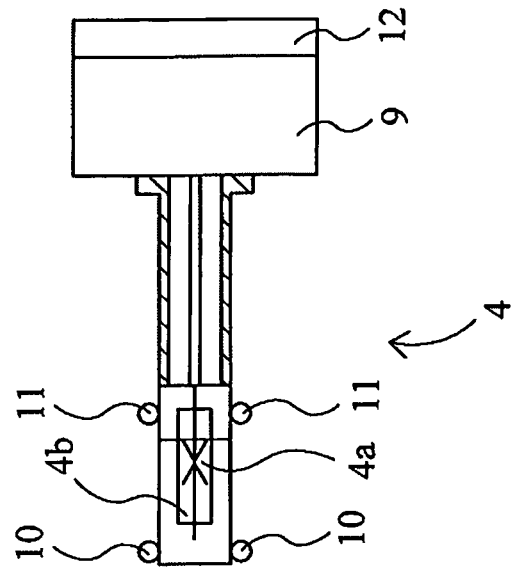
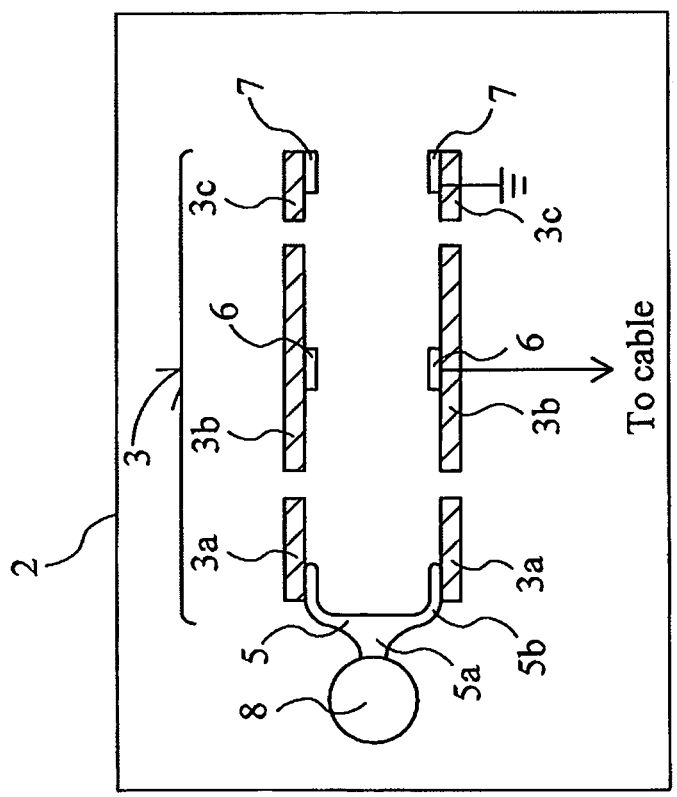
Fig. 1c

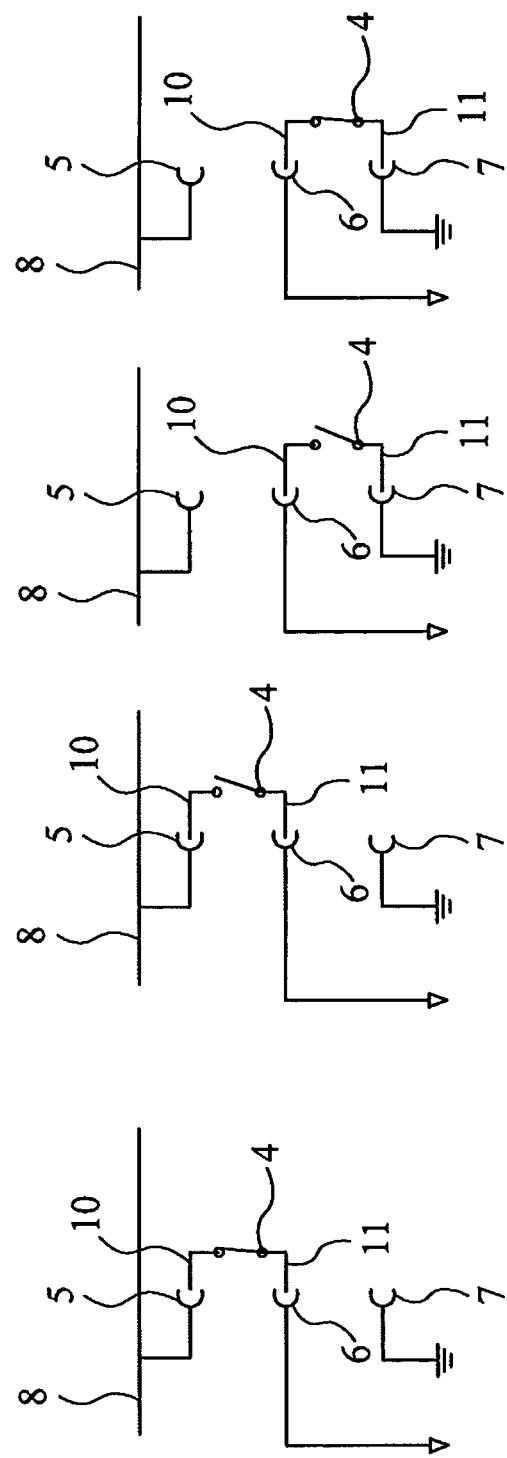

TERMINAL FOR AN ELECTRICAL SWITCHGEAR

CROSS-REFERENCE TO RELATED APPLICATIONS

This patent application is a national stage entry under 35 U.S.C. §371 of International Application No. PCT/EP2011/000992, filed Mar. 1, 2011, and claims priority to European Patent Application No. EP 10002055.1, filed Mar. 1, 2010, European Patent Application No. EP 10002054.4, filed Mar. 1, 2010, and European Patent Application No. EP 10002053.6, filed Mar. 1, 2010. The International Application was published in English on Sep. 9, 2011, as WO 2011/107254 A1.

FIELD

The present invention relates to a terminal for an electrical switchgear.

BACKGROUND

A switchgear is an integrated assembly of switches, buses fuses and other components used to isolate electrical equipment at an electrical installation, for example, an electrical power sub-station. Switchgear is used to both de-energise equipment to allow work to be done and to clear faults downstream of the switchgear. Switchgear is often housed in a metal cabinet at the installation.

A distinction is made between so called 'fixed switchgear' and so called 'withdrawable switchgear'. In fixed switchgear the main circuit breaker is fastened within the installation by fasteners, for example bolts, and cannot be removed from the installation without using tools to undo the fasteners. In withdrawable switchgear additional constructional features enable the main circuit breaker to be withdrawn from the installation (and put back in) with a minimum usage of tools or with no usage of tools. Accordingly, in a withdrawable switchgear, the main circuit breaker can be removed quickly for maintenance or replacement or to provide easy access to other components in the installation.

Conventional switchgear comprises a number of electrical terminals or poles, typically two or more, each electrically isolated from the other, and comprising an insulating housing containing an electrical contact. The insulating housings may be made of epoxy resin. In one known arrangement, one such terminal has an electrical contact for a bus or power rail and another such terminal has an electrical contact for a cable connection routed to a load. An electrical connection is established between the bus and the load by inserting into each terminal housing a respective one of a pair of electrical contacts of a circuit breaker. In this way, one circuit breaker's contact engages the contact of one of the terminals and the other circuit breaker's contact engages the other terminal's contact so that the electrical path is established between the bus and the load through the breaker. Each terminal's housing is generally conical in shape, with a circular cross section. In air insulated switchgear the terminals must be separated by a certain gap for insulation purposes.

U.S. Pat. No. 3,889,722 describes a plastic insulated switching unit for a multiphase high voltage switchgear. The switching unit comprises an insulating housing defining a cylindrical cavity and fixed ring-shaped contacts at an inside wall of said housing. A drawout switching device comprises a projecting tubular pole, having an operating mechanism. The tubular pole comprises ring-shaped contact pieces mounted on its outside. The switching device is moveable between a fully inserted position and an isolating position. In U.S. Pat. No. 3,889,722 the fixed ring-shaped contacts are each located in a recess formed in the inner surface of the insulating housing.

It is desirable to provide an improved terminal for an electrical switchgear and in particular one that allows for a more compact switchgear.

SUMMARY

In an embodiment, the present invention provides a terminal for an electrical switchgear. The terminal includes: a housing arrangement including an electrically insulating material and having an inner surface defining a cavity; and a first terminal electrical contact contained in the housing arrangement for making an electrical connection with an electrical component insertable into the cavity. The first terminal electrical contact is located in a first recess formed in the inner surface, the first terminal electrical contact being flush with the inner surface.

DESCRIPTION OF THE DRAWINGS

FIG. 1c is a schematic illustration of a sectional view of the switch arrangement with the circuit breaker in a third position;

FIGS. 2a to 2d are circuit diagrams of the switch arrangement in various switch configurations;

FIG. 4b is a schematic front view of the inside of an electrical switchgear, that is a variation of that shown in FIGS. 3 and 4a.

DETAILED DESCRIPTION

The invention will be described in more detail below, with reference to the accompanying drawings.

According to an embodiment of the invention, there is provided a terminal for an electrical switch gear. Locating a terminal contact in a recess formed in the inner wall of the housing, wherein the terminal contact is flush with the inner surface, means that the diameter of the cavity defined by inner wall can be reduced optimally because it does not need to accommodate the terminal contact. Advantageously, reducing the diameter of the cavity means that the diameter of the terminal can likewise be reduced (over much of the circumference of terminal, if not all of it) which provides for a more compact terminal.

The first terminal electrical contact, may for example, be for one of a bus, a load connection or ground.

According to the invention there is also provided a switch arrangement for an electrical switchgear the switch arrangement comprising such a terminal and an electrical component moveable into the cavity for making a sliding electrical contact with any of the terminal electrical contacts. The component may be circuit breaker.

According to the invention, there is also provided electrical switchgear comprising one or more such terminals or one or more such switch arrangements.

Figure 1A:
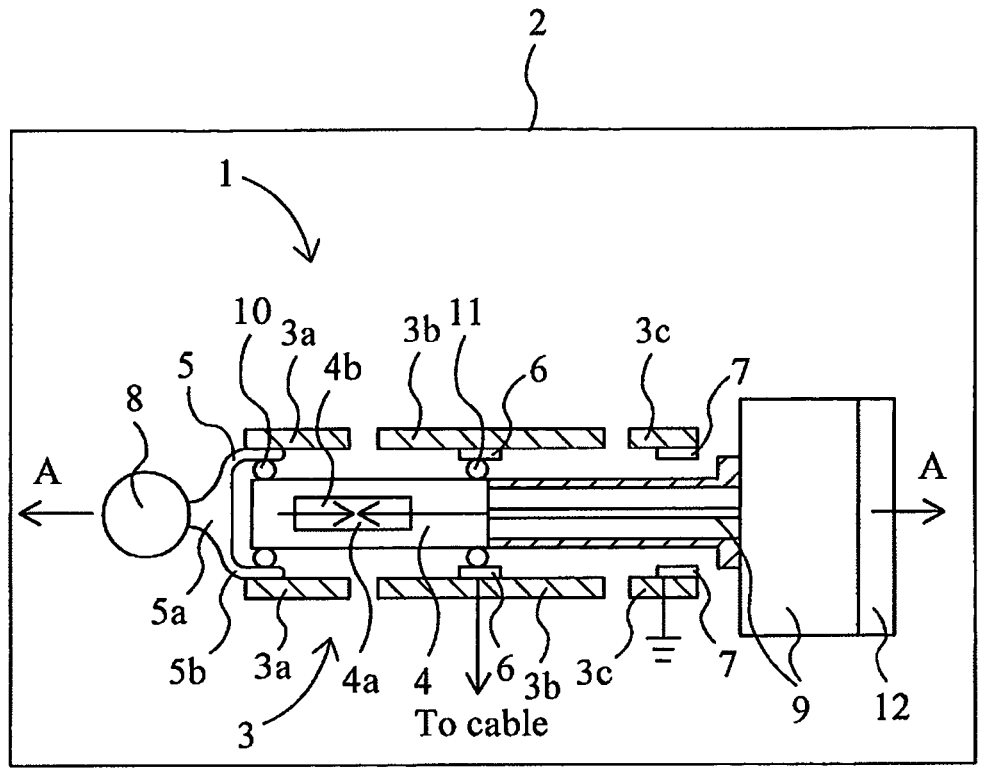
FIG. 1a is a schematic illustration of a side sectional view of a switch arrangement with a circuit breaker in a first position.
Figure 1B:
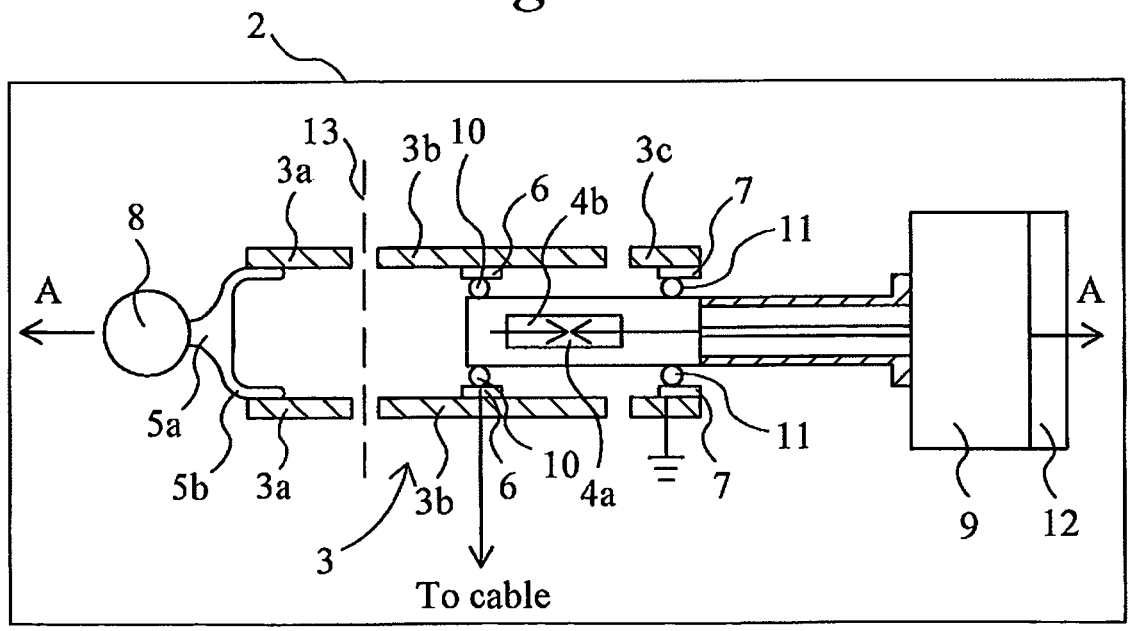
FIG. 1b is a schematic illustration of a side sectional view of the switch arrangement with the circuit breaker in a second position.

Referring to FIGS. 1a to 1c, a switch arrangement 1 for an electrical switchgear 2 comprises an electrical pole or terminal 3 and a circuit breaker 4. The terminal 3, is fixed within the switchgear 2 and comprises a housing made up of first 3a, second 3b and third 3c electrically insulating tubular sections of substantially equal diameter, which as will be explained in greater detail below have a substantially oval cross section, and which are spaced apart lengthwise along a common axis A. The three tubular sections may for example be formed of an epoxy resin material. Each of the three tubular sections 3a, 3b and 3c has a respective electrical contact 5, 6, 7 located inside of it. The first section 3a has a bus bar contact 5 for making an electrical connection on an electrical bus 8 of the switchgear 2, the second section 3b has a cable contact 6 for making an electrical connection to a cable (not shown) of the switch gear 2 and onwards to a load (not shown) and the third section 3a comprises a ground contact 7 for making an electrical connection to ground. In this example, the conductive contacts 5, 6, 7 are formed of metal, preferably copper, with the cable contact 6 and the ground contact 7 being loop shaped and arranged around the respective inner surfaces of the second 3b and third 3c insulating sections, and the bus bar contact 5 being cup shaped and having a base 5a connected to the bus-bar 8 and a side 5b arranged around the inner surface of the first insulating section 3a.

The circuit breaker 4, which may be a vacuum interrupter, is preferably generally cylindrical in shape, and is arranged lengthwise along the axis A and is moveable in and out of the inside of the terminal 3. If the breaker 4 is a vacuum interrupter, as is standard with such devices, it comprises two internal electrical contacts 4a, enclosed in a vacuum chamber 4b, one fixed and the other moveable and a breaker actuator assembly 9 for moving the moveable contact away from the fixed contact to open (i.e. trip) the breaker 4 in the event of a fault (e.g. an over current) being detected.

In this embodiment, the circuit breaker 4 further comprises at its respective ends, first 10 and second 11 external electrical contacts, each of which is preferably a loop shaped metal (e.g. copper) coil located in a respective annular groove (not shown) that extends around an external diameter of the breaker 4, although different arrangements of contacts are also possible, for example, pad shaped contacts.

The switch arrangement 1 further comprises a powered drive mechanism 12 for causing linear movement of the circuit breaker 4, in the terminal 3, between a first position illustrated in FIG. 1a and a second position shown in FIG. 1b.

It can be seen that the inner surface of the housing defines a cavity through which the breaker 4 can be moved.

In the first position, the first contact 10 slideably engages the bus-bar contact 5 and the second contact 11 slideably engages the cable contact 6. Accordingly, as illustrated in the circuit diagram of FIG. 2a, when the circuit breaker 4 is in the first position and is closed (i.e. the internal contacts 4a are closed) the bus-bar 8 is electrically connected via the breaker 4 to the cable contact 6 so that the switch gear arrangement 1 can supply power to a load (not shown). As illustrated in FIG. 2b, when the circuit breaker 4 is in the first position but it is open (i.e. the internal contacts 4a are open) the bus-bar 8 is electrically disconnected by the breaker 4 from the cable contact 6 and the switch gear arrangement 1 cannot supply power to the load (not shown).

In the second position, the first contact 10 slideably engages the cable contact 6 and the second contact 11 slideable engages the ground contact 7. Accordingly, as illustrated in the circuit diagram of FIG. 2c, when the circuit breaker 4 is in the second position and is open, the cable contact 6 is electrically disconnected from the bus-bar 8 and from the ground contact 7. As illustrated in FIG. 2d, when the circuit breaker 4 is in the second position but is closed, the cable contact 6 is electrically disconnected from the bus-bar 8, but is electrically connected to ground via the circuit breaker 4. In one or other of these configurations of the second position, maintenance or testing of components can be performed.

FIG. 1c illustrates the circuit breaker 4 in a third position in which it is withdrawn from the switch gear arrangement 1. The circuit breaker 4 may be driven between this position and the second position along the axis A by the drive mechanism 12. Alternatively, the circuit breaker 4 and the drive mechanism 12 may be constructed as an integrated unit, which a human operator can manipulate manually between the second and third positions or can be power driven between the second and third positions.

Optionally, a shutter 13 is provided, which can be drawn into the position shown in FIG. 1b, as a physical barrier between the bus bar contact 5 and the breaker 4, so that tests can be performed on the breaker.

The housing may be transparent to allow for easy visible inspection of components.

Figure 3A:
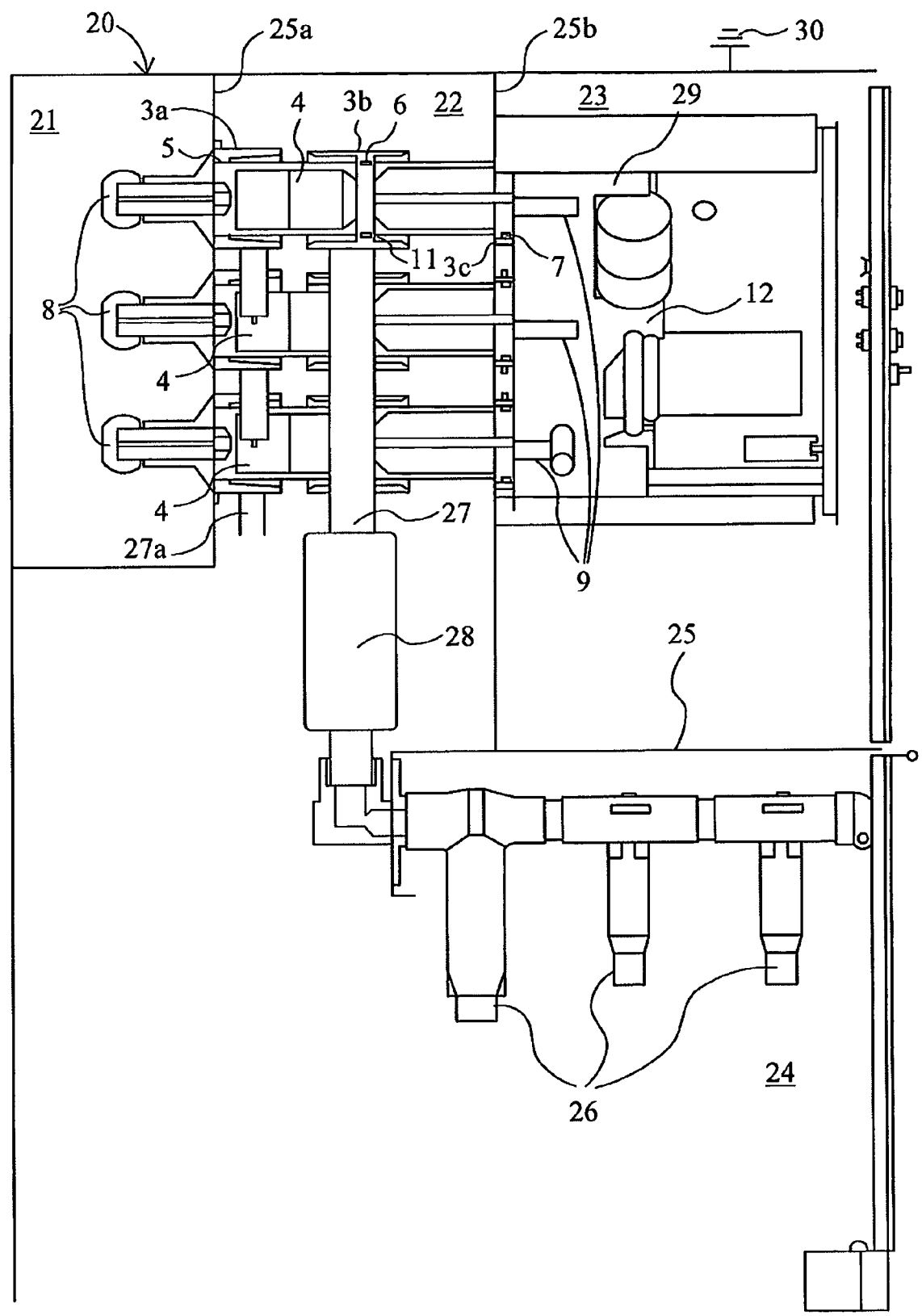
FIG. 3a is a side view of the inside of an electrical switchgear comprising a switch arrangement with a circuit breaker shown in a first position.
Figure 3B:
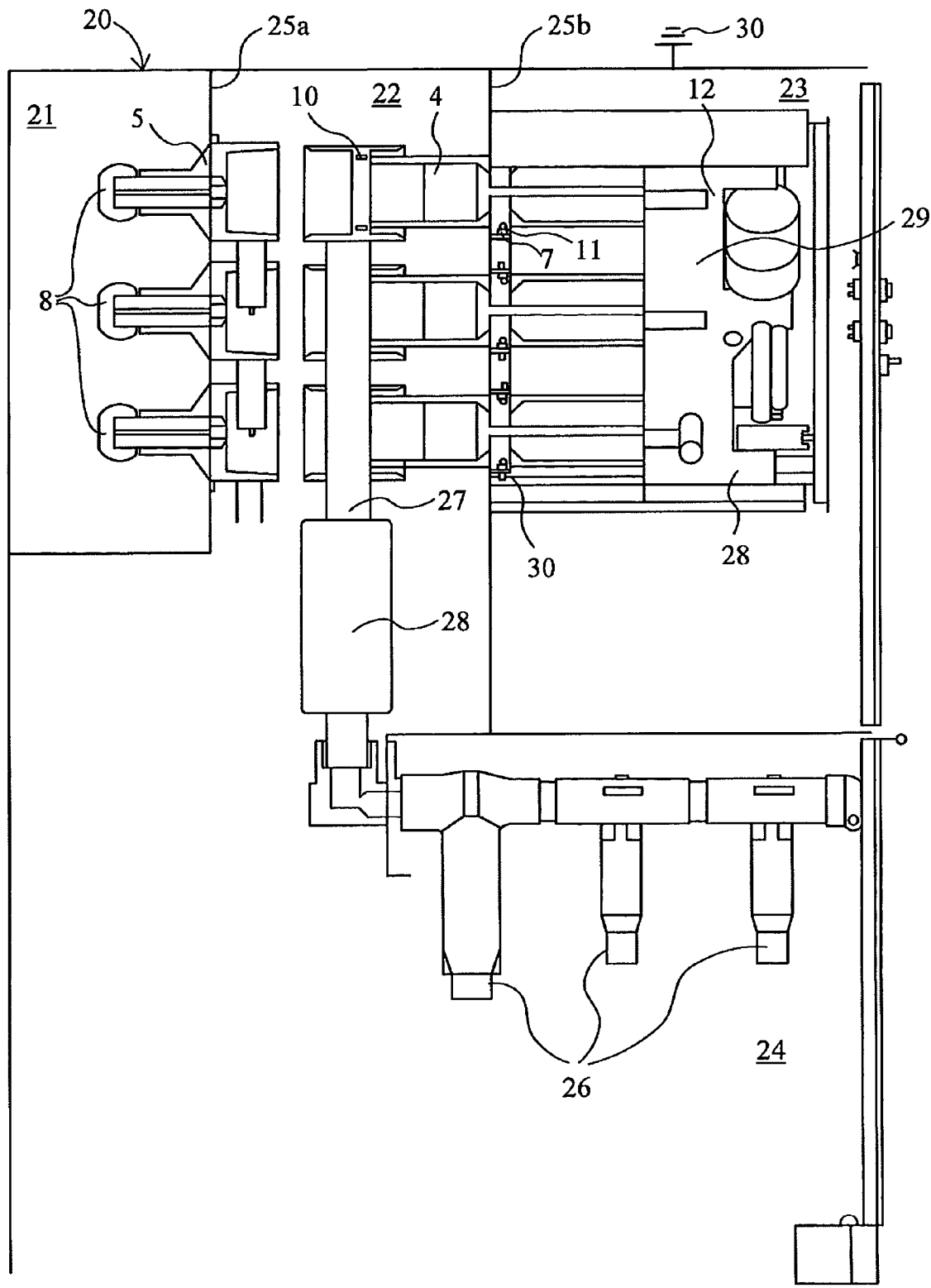
FIG. 3b is a side view of the inside of the electrical switchgear comprising the switch arrangement with the circuit breaker shown in a second position.
Figure 3C:
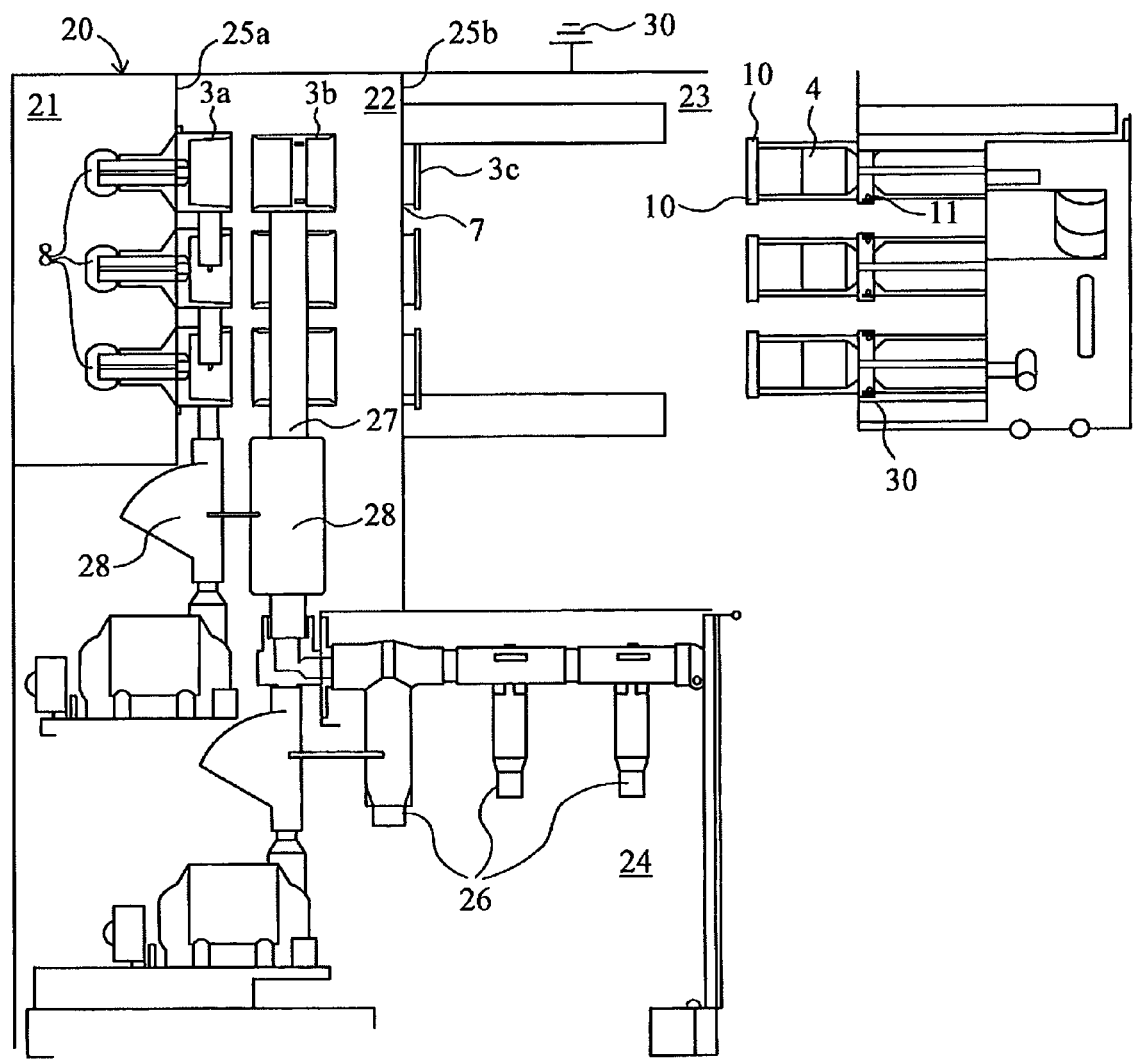
FIG. 3c is a side view of the inside of the electrical switch gear comprising the switch arrangement with the circuit breaker shown in a third position.
Figure 3D:
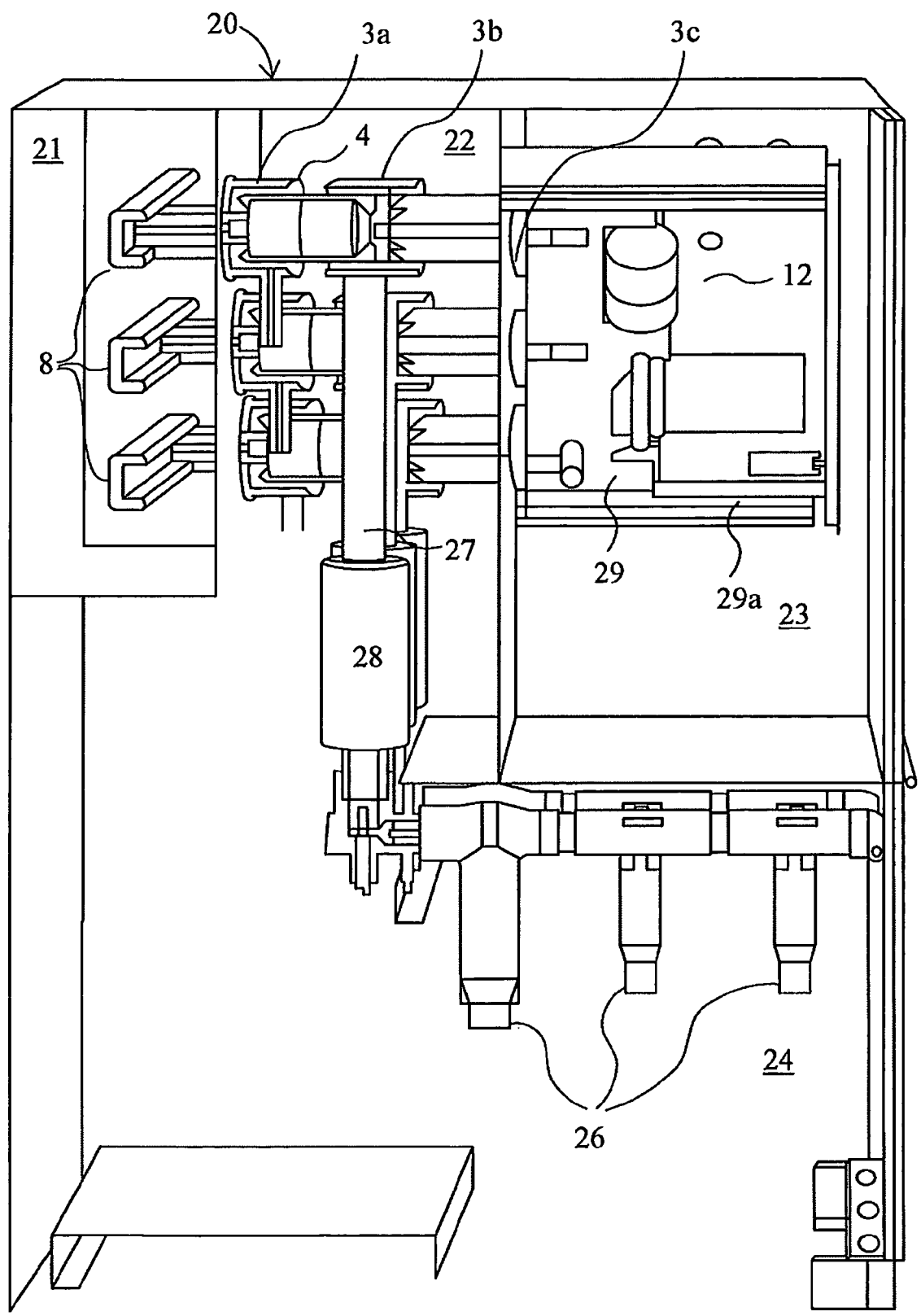
FIG. 3d is a perspective view of the inside of the electrical switchgear.

FIGS. 3a to 3c illustrate a side view of the inside of a cabinet 20, housing an air insulated medium voltage electrical switchgear 2 embodying the present invention. FIG. 3d illustrates a perspective view of the inside of the cabinet 20. Features the same as those already described with respect to FIGS. 1a to 1c are given the same reference numerals in FIGS. 3a to 3d as they are in FIGS. 1a to 1c.

The cabinet 20 is divided by internal partitions 25 into a plurality of compartments 21 to 24 containing the internal components of the switchgear 2. The switchgear 2 is a three-phase system and so comprises three conductive busbars 8 in an upper rearward section 21.

Each busbar 8 is provided with a terminal 3, of the type illustrated in FIGS. 2a to 2c, which extends from the upper rearward compartment 21, across an upper middle compartment 22, to an upper forward compartment 23. A circuit breaker 4, also of the type illustrated in FIGS. 2a to 2c, is associated with each terminal 3. As shown in the Figures, each terminal's 3 first tubular section 3a is partly in the upper rearward compartment 21 and partly in the upper middle compartment 22 and extends through the partition 25a which divides these two compartments; each terminal's 3 second tubular section 3b is supported in the upper middle compartment 22; and each terminal's 3 third tubular section 3c is in the upper forward section 23 and defines an aperture (best seen in FIG. 3c) through the partition 25b separating the upper forward section 23 and the upper middle section 22.

A bottom compartment 24 contains three groups of three cable terminations 26 (only one group of the three is visible in FIGS. 3a to 3c) which are connectable to cables (not shown) routed to a load (not shown). Each group of three cable terminations 26 is connected to a respective one of three conductors 27, which is routed to a cable contact 6 of a respective one of the terminals 3. Each conductor 27 may be fitted with measuring equipment 28, for example, a current transformer, voltage transformer or other such device.

A drive means 12 for driving each circuit breaker 4 between the first position illustrated in FIG. 3a (and FIG. 1a) and the second position illustrated in FIG. 3b (and FIG. 2b) is contained in the upper forward compartment 23. In this embodiment, the drive means 12 comprises a power driven carrier unit 29 mounted on a rail system 29a (see FIG. 3d) which supports the breakers 4, and is driven back and forth on the rail system to move the breakers 4, in unison, between the first and second positions. As explained above, the movement of the breakers 4 is substantially linear.

In the first position, each bus bar 8 is connected to a respective one of the three groups of cable termination 26 via a bus bar contact 5, a breaker 4, a cable contact 6 and a conductor 27. In the second position, each group of three cable termination 26 is connected to a ground connection via a respective conductor 27, a respective cable contact 6, a respective breaker 4, and a respective ground contact 7. The ground contact 7 is connected to the ground connection 30 via partition 25b and the metal cabinet 20.

FIG. 3c illustrates the third position in which the breakers 4 are withdrawn from the switch gear assembly. In this embodiment, the breakers 4 and the drive means 12 form an integrated unit which is easily removeable from the switchgear 2.

As is best seen in FIG. 3d, the terminals 3 are arranged within the cabinet 20 in parallel, and diagonally relative to the sides of the cabinet, with the breakers 4 correspondingly arranged. This provides for a more compact arrangement than could be achieved by arranging the terminals 3 and breakers 4 in parallel, and horizontally or vertically.

Figure 4A:
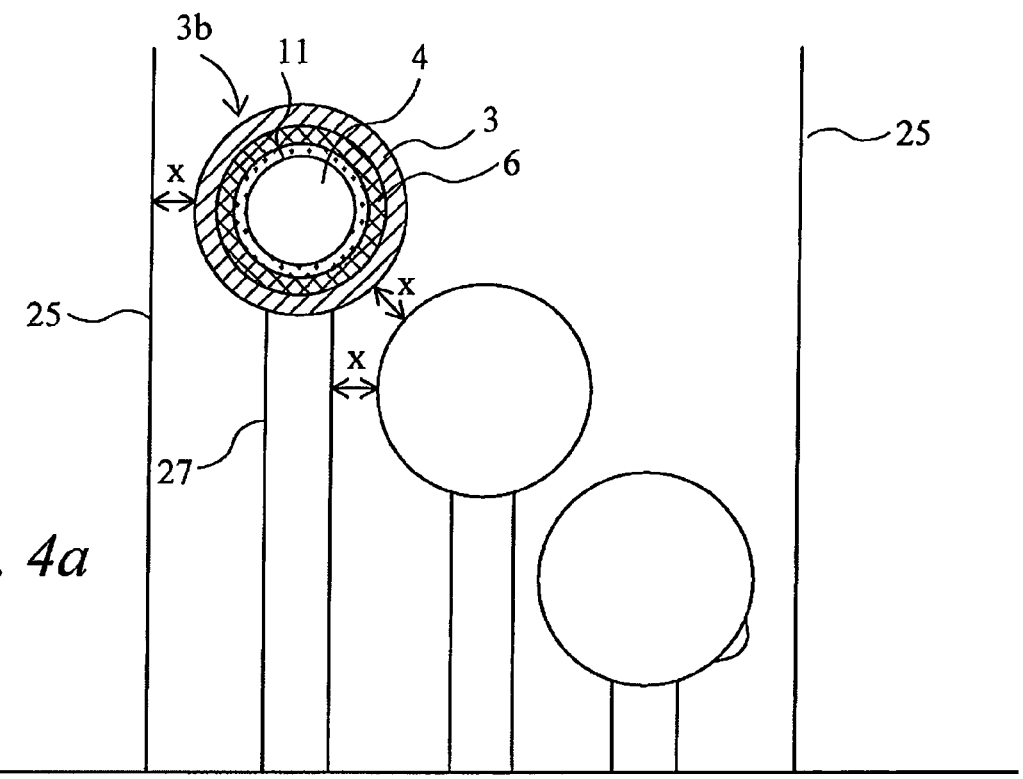
FIG. 4a is a schematic front view of the inside of the electrical switchgear.

FIG. 4a illustrates a cross sectional view through the second sections 3b of the three terminals 3 viewed front on (although for simplicity, internal details, which are same for all three sections, are illustrated only in one). It can be seen that each housing section 3b has a cross section, in a plane substantially perpendicular to its longitudinal axis (i.e. the axis perpendicular to the plane of the page), that is substantially circular. FIG. 4a shows each housing section 3b with a breaker 4 inserted therein, in the first position.

In this example, each cable contact 6 is a conductive tube or a ring inserted in the housing section 3b and is coaxial with the housing section 3b. The inner radius of each housing section 3b and the outer radius of each cable contact 6 are substantially the same so each cable contact 6 fits snugly in a housing section 3b. Each breaker 4 is generally cylindrical in shape and its first and second 11 contacts (only the second contacts 11 are visible in FIG. 4a) are metal coils each located in a respective annular groove (not shown) that extends around an external diameter of the breaker 4.

It will be appreciated that the fit between the terminal contacts and the external breaker contacts 11 is such that the breaker 4 can be slid in the housing between the first and second positions.

Although not illustrated, a corresponding cross section through the first sections 3a or the third sections 3c would look the same as that illustrated in FIG. 4a.

As is illustrated, for insulation purposes, a distance x is maintained between adjacent ones of the switching arrangements of the three different phases and between each of the switching arrangements of the two outer phases and ground.

Figure 4B:
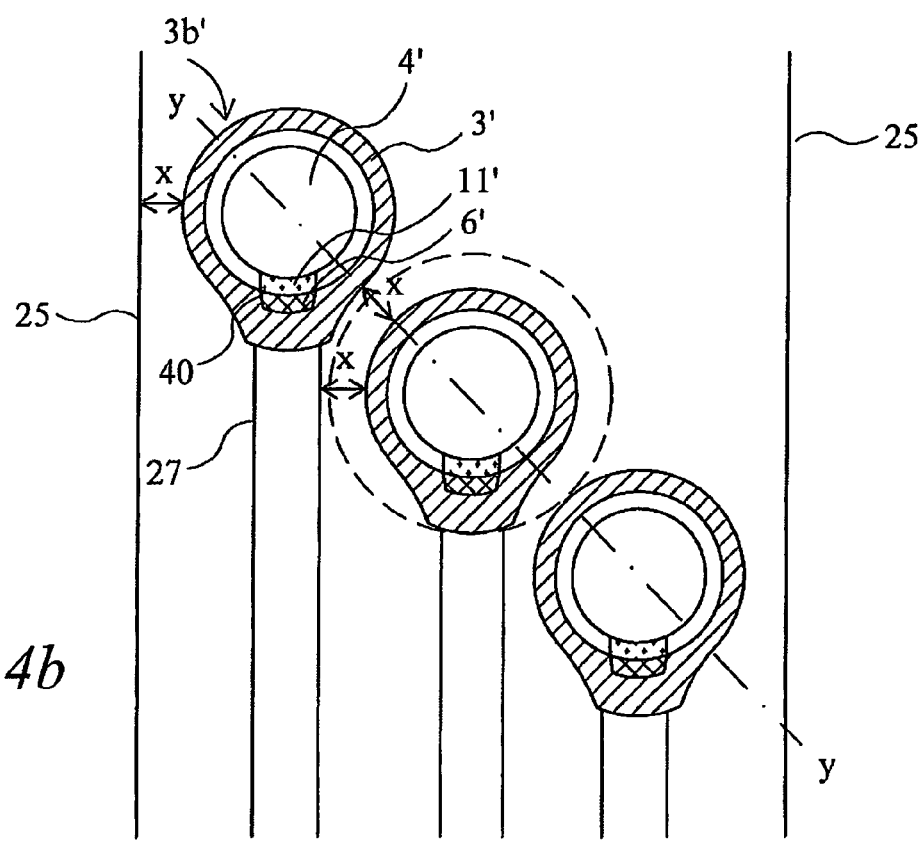

FIG. 4b illustrates a cross section through the second sections 3b' of three terminals 3' viewed front on, in which terminals 3' the terminal contacts are arranged differently to those described above. In this arrangement, each second section 3b' comprises a recess 40 formed in its inner surface and a cable contact 6' is located in the recess 40. The recess 40 and its associated contact 6' extend partially around a circumference of the inner wall, in this example, defining a segment that subtends an angle of approximately 30 degrees with the centre of the second section 3b'.

Although not illustrated, the recess 40 and its contact 6' also extend to some extent along the axial direction of the terminal section 3b. With this arrangement it will be appreciated that each contact 6' is a strip having a slightly curved upper surface that is flush with the inner wall of the second section 3b.

Optionally, the thickness of a second section 3b' may vary around its circumference, being thicker in the region around a contact 6'. This additional thickness increases the rigidity of the section 3b' around the contact. This may be advantageous if for the example the contact 6' is formed of a relatively heavy metal like copper, rather than a lighter metal like aluminium.

In the arrangement shown in FIG. 4b, each second section 3b' has a cross section that is generally oval in shape, although it may instead be circular or indeed some other shape.

Although not illustrated, each terminal 3' comprises first and third sections that correspond with the sections 3a and 3b described above, except that the cross sectional shape of the sections and the arrangement of the terminal contacts therein correspond with the arrangement of FIG. 4b.

Each breaker 4' comprises at its respective ends, first and second 11' external electrical contacts (only the second is illustrated in FIG. 4b), each of which extends partially around the external diameter of the breaker 4' and has a width and length that substantially matches those of the housing contacts.

Locating a terminal contact in a recess formed in the inner wall of the housing means that the diameter of the cavity defined by inner wall can be reduced because it does not need to accommodate the terminal contact. Advantageously, reducing the diameter of the cavity means that the diameter of the terminal can likewise be reduced (over much of the circumference of terminal, if not all of it) which provides for a more compact terminal.

As is illustrated in 4b, the insulation gaps x is again maintained between adjacent ones of the three different phases and between the two outer phases, but because the outer diameter of each housing section is smaller than the outer diameter of each housing section in FIG. 4a, the FIG. 4b arrangement is more compact. For comparison, a dotted line around the middle terminal of FIG. 4b, illustrates the larger external diameter of a terminal having the FIG. 4a arrangement.

In this example, the terminals are arranged substantially in parallel in the switchgear and are spaced apart along a diagonal line Y-Y. This is a particularly space efficient arrangement. However, it should be appreciated that the terminals may also have alternative spatial arrangements, for example, arranged in a horizontal or vertical line and still provide for more space efficient switchgears.

Indeed, a switchgear comprising a single terminal may be made more compact than one also comprising a single terminal but having a traditional circular cross section.

Many modifications or variations may be made to the described embodiment.

For example, although the described terminal housing is in three distinct separate sections, it may instead be a single unitary housing section, with the contacts 5, 6, 7 being spaced apart along its length and electrically isolated from each other.

Alternatively, the housing may comprise two distinct sections, with one of the contacts, say the bus bar contact 5, in one section, and the other two contacts in the other section.

Although a terminal of the preferred embodiment comprises three electrical contacts, this is not essential. Any number of contacts may be provided depending upon requirements. For example, a terminal may comprise a unitary housing comprising a single electrical contact connected to a bus, or to a load, or to ground.

Furthermore, although in the preferred embodiment, each terminal contact is for engaging a contact on a breaker to make an electrical connection, this is not essential. An electrical contact of a terminal embodying the present invention may engage any type of contact for the purpose of making an electrical connection.

Although the drive means is described as being powered it may be manually operated.

Although in the described embodiment, the switching device 4 is a circuit breaker, it will be appreciated that other breaker devices (i.e. devices that can make or break a circuit when in the first or second positions) may be used, for example, a contactor, a load break switch or an isolation switch.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A terminal for an electrical switchgear, the terminal comprising:
    a housing arrangement comprising an electrically insulating material and having an inner surface defining a cavity;
    a first terminal electrical contact contained in the housing arrangement for making an electrical connection with an electrical component insertable into the cavity; and
    a second terminal electrical contact contained in the housing arrangement for making an electrical connection with the electrical component,
        wherein the first terminal electrical contact is located in a first recess formed in the inner surface,
        wherein the first terminal electrical contact is flush with the inner surface,
        wherein the second terminal electrical contact is spaced apart from the first terminal electrical contact along an axial direction of the housing arrangement and is located in as second recess formed in the inner surface, and
        wherein the second terminal electrical contact is flush with the inner surface of the housing arrangement.

2. A terminal according to claim 1, further comprising a third terminal electrical contact contained in the housing arrangement wherein the third terminal electrical contact is spaced apart from the first terminal electrical contact and the second terminal electrical contact along the axial direction and is located in a third recess formed in the inner surface, wherein the third terminal electrical contact is flush with the inner surface of the housing arrangement.

3. A switch arrangement for an electrical switchgear, the switch arrangement comprising:
    a terminal according to claim 2; and
    an electrical component moveable into the cavity for making a sliding electrical contact with any of the terminal electrical contacts.

4. A terminal according to claim 1, wherein, the housing arrangement is split into a plurality of separate sections arranged along the axial direction, and wherein at least one of the electrical contacts is in one of the sections and at least another of the electrical contacts is in another of the sections.

5. A terminal according to claim 1, wherein any of the recesses and the terminal electrical contacts contained therein extend partially around a respective circumference of the inner surface.

6. A terminal according to claim 1, wherein the housing arrangement becomes thicker in a region around any of the terminal electrical contacts.

7. A terminal according to claim 1, wherein the housing arrangement comprises a cross section, in a plane that passes through any of the terminal electrical contacts and which lies substantially perpendicular to the housing arrangement's longitudinal axis, that is substantially oval shaped.

8. A terminal according to claim 1, wherein the first terminal electrical contact is a contact for one of a bus, a load and earth.

9. A switch arrangement for an electrical switchgear, the switch arrangement comprising:
    a terminal according to claim 1; and
    an electrical component moveable into the cavity for making a sliding electrical contact with the first electrical contact and the second electrical contact to electrically connect the two.

10. A switch arrangement according to claim 9, wherein the electrical component is a breaker.

11. A switch arrangement according to claim 10, wherein the breaker is one of a circuit breaker, a contactor, a load break switch or an isolation switch.

12. Electrical switchgear comprising a terminal according to claim 1.

13. Electrical switchgear according to claim 12 comprising a plurality of terminals.

14. Electrical switchgear according to claim 13, wherein the plurality of terminals or a plurality of switch arrangements each comprising one of the terminals are arranged substantially in parallel in the switchgear, either laterally or diagonally.

15. A terminal for an electrical switchgear, the terminal comprising:
    a housing arrangement comprising an electrically insulating material and having an inner surface defining a cavity; and a first terminal electrical contact contained in the housing arrangement for making an electrical connection with an electrical component insertable into the cavity;
wherein the first terminal electrical contact is located in a first recess formed in the inner surface,
wherein the first terminal electrical contact is flush with the inner surface, and
wherein the housing arrangement comprises a cross section, in a plane that passes through any of the terminal electrical contacts and which lies substantially perpendicular to the housing arrangement's longitudinal axis, that is substantially oval shaped.

* * * * *